Patented July 10, 1951

2,560,368

UNITED STATES PATENT OFFICE 2,560,368

INHIBITION OF ICE FORMATION IN FUELS

Leonard J. Richards, Wirral, and Keith R. Williams, London, England, assignors to Shell Development Company, San Francisco, Calif., a corporation of Delaware No Drawing. Application April 12, 1949, Serial No. 87,136. In Great Britain September 30, 1948

2 Claims. (Cl. 44—67)

The present invention relates to a method of reducing the tendency of water present as an impurity in liquid fuels to precipitate as a solid at reduced temperatures. More particularly it relates to methods of preventing the clogging of fuel filters of internal combustion engines, especially aviation internal combustion engines, using such water-contaminated fuels, when such clogging of fuel filters is due to the precipitation at low temperatures of small crystals of the adulterant water.

Liquid fuels very often contain small but significant amounts of water, the fuel often being saturated with water. The presence of such water may be accidental, or it may be the result of the widespread practice of storing fuels, particularly those having a relatively high volatility, over water. In either case, if such fuels are exposed to low, or reduced, temperatures, such as normally occur, for example, at high altitudes or in arctic or near arctic latitudes, the water in the fuel is precipitated in the form of crystals of ice which are usually too small to settle quickly, but which are large enough to clog the filters through which a fuel passes on its way to the combustion chamber or cylinder of an internal engine. This precipitation constitutes a serious problem, particularly in aviation turbine or jet fuels, owing partly to the fineness of the filtration to which these fuels are subjected and partly to the great altitudes at which jet-propelled aircraft cruise. The problem is not, however, confined to just those fuels, but may also be present in the use of other fuels, such as those for aviation and automotive piston engines, particularly in cold latitudes or, for example, under extreme conditions of artificial cooling to avoid vapor lock.

It is an object of this invention to eliminate the above-mentioned adverse effects of water in fuels, and more particularly to provide a method for greatly reducing the tendency of water present as an impurity in internal combustion engine fuels to precipitate as a solid. A further object is to provide methods for storing such fuels under conditions which will greatly reduce the precipitating tendency. An even further object is to provide a method for preventing clogging of fuel filters of internal combustion engines due to precipitation of adulterant water in the fuel at low temperatures. Additional objects will become apparent hereinafter.

It has now been found that the tendency of ice crystals to precipitate at low temperatures from fuels containing water may be greatly reduced and even practically eliminated by causing the fuel to come into direct contact with a solid aggregate containing a water-soluble and substantially fuel-insoluble compound selected from the group of metal oxides, metal inorganic salts, and mixtures thereof.

Thus, according to one embodiment of the present invention, a container made of gauze-like material, perforated metal sheet, or the like, is filled with a suitable compound in the form of a loose granular powder, said container being then suspended or otherwise placed in a tank containing the fuel. In this manner, the liquid fuel can easily come in direct contact with the solid within the container, but the solid is confined and cannot migrate throughout the body of the fuel. Thus, there is no danger of the fuel filters being blocked by the solid compound. It is readily seen that the foregoing embodiment may be used advantageously in plane or vehicle fuel tanks, bulk storage tanks, and the like. If the fuel is stored over water, care must be taken in placing the water-soluble, fuel-insoluble compounds so that leaching by the water may be minimized. Likewise, the aggregates of solid compounds may take forms other than granular powders, such as, for example, briquettes of powdered materials consolidated by compression and/or sintering. If a more positive and thorough contacting of the fuel by solid aggregate is desired than is obtained by the above method, which method depends largely upon diffusion within the liquid phase, the confined aggregate may be placed in a fuel line, or over the fuel outlet of the tank, or some similar location, so that the entire body of fuel is forced to flow over or through the aggregate.

The particular compounds which are effective when used according to this invention are those metallic oxides and metallic inorganic salts which are substantially insoluble in fuel in the absence of water, and which are readily soluble in water in the absence of fuel. Ideally, the compounds should be completely insoluble in the fuel, but solubilities of the order of magnitude of about 0.1% by weight, or slightly above, at 20° C., may be tolerated if necessary, and if the particular compound in such high concentrations is not detrimental to the engine, or engine performance. Solubilities in fuel of about 0.01% by wt. at 20° C., or less, will usually be preferable, particularly in that the rate of consumption of solid compound will be lower. The desired solubility of the compound in water will be determined largely by the temperature conditions to which the fuel is to be subjected, i. e., the lowest temperature at which ice particle formation is to be inhibited. It is, of course, well known that the addition of a solute to water will lower the freezing thereof by an amount approximately proportional to the weight of the solute added. Consequently the maximum freezing point depression obtainable with any given solute is limited by the solubility of the solute. Surprisingly, this effect of a solute upon the freezing point of water is reproduced, at least qualitatively, when the water is dissolved in predominantly large amounts of the fuel. Thus, the maximum reduction of the temperature at which ice particles precipitate from the fuel will be, as before, largely dependent upon the solubility of the compound in water. Thus, far use of fuels under relatively mild low temperature conditions, salts or oxides having solubilities as low as about 5 or 10% by weight may give sufficient protection, whereas under more extreme conditions, solubilities of 50% by weight, or higher, may be required.

Other considerations, besides total solubilities, in the choice of a particular solid material, or of materials, for use according to the present invention are such things as the effect of temperature upon the solubility of the solid, and corrosivity toward the various metal, or other material, parts which will be contacted. With respect to the former, it is obvious that solutes having only a slight change of solubility with temperature are desirable, so that the tendency to precipitate the dissolved solids at lowered temperatures will be at a minimum.

Examples of compounds which have particularly useful and desirable properties for the above purposes are chromium trioxide (also known as chromic anhydride), anhydrous ferric chloride, anhydrous calcium chloride, and anhydrous zinc chloride. Chromic anhydride, for instance, has a negligible solubility in neat fuels, and is soluble in water to the extent of about 62% by weight at 20° C., which latter solubility decreases by only about 2% when the temperature drops to the minimum freezing point of aqueous solutions of chromium trioxide, namely −155° C.

It is contemplated that mixtures of these solids may also be employed, a particularly advantageous combination being one containing both chromium trioxide and anhydrous calcium chloride. The chromium trioxide is effective at lower temperatures, and has less tendency to precipitate when the temperature is reduced, but the calcium chloride is more effective in redissolving ice crystals already present in the fuel.

In order to demonstrate the surprising effectiveness of this invention, a fuel saturated with water, which had previously caused filter clogging at −20° C. was contacted with a mixture of calcium chloride and chromic anhydride for a period of 3 hours. Thereafter, no filter clogging occurred down to −43° C., the cloud point of the fuel.

The consumption of solid will of course be determined by its solubility and by the percentage of water present in the fuel. If the fuel is saturated with water, its water content will be of the order of magnitude of 0.005% by weight. If chromium trioxide is used as the de-icing solid, the consumption thereof under such conditions will be about ½ pound per 1,000 gallons of fuel contacted.

Ordinarily, free, or undissolved, water will not be present in the fuel. If, however, such excess water is present, for example, in the form of an emulsion with the gasoline, it is clear that this invention will also prevent filter clogging by the freezing of such water. The solid de-icing compound consumption will, of course, be proportionately greater, if greater than saturation amounts of water are present.

We claim as our invention:

1. A method of reducing the tendency of water present as a dissolved impurity in a liquid hydrocarbon internal combustion engine fuel to precipitate as ice crystals at reduced temperatures which comprises intimately contacting said fuel, prior to the introduction thereof into the combustion chamber of an internal combustion engine, with solid chromium trioxide by flowing said fuel in a liquid state through a confined mass of said solid chromium trioxide.

2. The method of claim 1 wherein the solid confined mass contains, in addition to the chromium trioxide, a sufficient amount of calcium chloride to redissolve any ice crystals formed prior to contacting said fuel with said chromium trioxide.

LEONARD J. RICHARDS.
KEITH R. WILLIAMS.

REFERENCES CITED

The following references are of record in the file of this patent:

UNITED STATES PATENTS

| Number | Name | Date |
|---|---|---|
| 1,405,320 | Pedersen | Jan. 31, 1922 |
| 2,064,325 | Sutton | Dec. 15, 1936 |
| 2,071,488 | Zimmer | Feb. 23, 1937 |
| 2,241,638 | Ffield | May 13, 1941 |
| 2,460,700 | Lyons et al. | Feb. 1, 1949 |